(12) United States Patent
Boeck

(10) Patent No.: US 6,173,566 B1
(45) Date of Patent: Jan. 16, 2001

(54) CASING CONSTRUCTION ON A GAS TURBINE JET ENGINE

(75) Inventor: Alexander Boeck, Zossen (DE)

(73) Assignee: BMW Rolls-Royce GmbH, Oberursel (DE)

( * ) Notice: Under 35 U.S.C. 154(b), the term of this patent shall be extended for 0 days.

(21) Appl. No.: 09/323,027

(22) Filed: Jun. 1, 1999

(30) Foreign Application Priority Data

May 30, 1998 (DE) ............................................. 198 24 421

(51) Int. Cl.[7] ....................................................... F02K 3/02
(52) U.S. Cl. ....................................... 60/226.1; 415/231.1
(58) Field of Search ................................. 60/39.31, 226.1; 415/213.1, 214.1, 220; 244/53 R

(56) References Cited

U.S. PATENT DOCUMENTS 4,976,102   12/1990   Taylor .

FOREIGN PATENT DOCUMENTS

3728437A1   3/1988   (DE) .
4122008A1   1/1993   (DE) .
4131813A1   4/1993   (DE) .

OTHER PUBLICATIONS

Search Report, Germany, Dec. 17, 1998.

Primary Examiner—Timothy S. Thorpe
Assistant Examiner—Eric D. Hayes
(74) Attorney, Agent, or Firm—Evenson, McKeown, Edwards & Lenahan, P.L.L.C.

(57) ABSTRACT

A casing construction is provided on a gas turbine having a fan downstream of which a precompressor is situated, the precompressor casing being detachably connected with the casing of the compressor which follows the precompressor—viewed in the flow direction. An upstream end section of the precompressor casing is additionally linked to the compressor casing by at least two tension-rod-type tension devices which are situated essentially diametrically opposite one another with respect to the longitudinal axis of the gas turbine. Steel cables are preferably used as the tension devices and are fastened at least on one of the two casings by means of a tension-nut-type end piece. As a result, the precompressor casing can be constructed of a non-high-strength material and, in addition, can be linked by means of several pairs of tension-rod type tension devices to the casing of the compressor.

12 Claims, 2 Drawing Sheets

CASING CONSTRUCTION ON A GAS TURBINE JET ENGINE

BACKGROUND AND SUMMARY OF THE INVENTION

This application claims the priority of German application 198 24 421.5, filed in Germany on May 30, 1998, the disclosure of which is expressly incorporated by reference herein.

The invention relates to a casing construction on a gas turbine having a fan downstream of which a precompressor is situated. The precompressor casing is detachably connected with the casing of the compressor which follows the precompressor—viewed in the flow direction. Such a casing construction is conventional art, for example, in the case of flight gas turbines, that is, twin-jet engines, in which the precompressor is also called a booster.

It is also customary to provide safety measures which, in the case of a breakage—which although improbable, is nevertheless theoretically possible—of the shaft (in the following called a fan shaft), which is assigned to the fan as well as to the precompressor (or booster), prevent a movement of the fan (that is, of the fan disk with the blades) toward the front out of the jet engine.

A first safety measure of this type consists of constructing the fan shaft in such a massive construction that, as proven, no breakage can occur.

According to another safety measure, in addition to the fan shaft, another (redundant) safety shaft is provided which, in the event of a breakage of the former shaft, can take over all occurring loads.

Finally, it may be provided as a further safety measure that, in the event of a shaft breakage, any connection parts of the fan shaft, specifically, in particular, the precompressor rotor (or booster rotor), strike against stationary casing parts so that, as a result, the fan, including the broken shaft piece, is prevented from moving out of the jet engine casing. These stationary casing parts are then components of the casing of the precompressor (that is, the booster casing). In a concrete embodiment, in the event of a breaking of the fan shaft, the booster rotor would then strike against the inner ring of the initial guide blades of the booster (or precompressor) and would therefore be prevented by it from moving away.

So that the casing of the precompressor which is adjoined by the casing of the compressor which follows the precompressor, viewed in the engine flow direction, can carry out this described safety function, this precompressor casing, in turn, must have a correspondingly massive construction. The reason is that, after the precompressor casing has been fastened by means of its downstream end on the compressor casing, while the forces occurring during a breakage of the fan shaft have to be absorbed by the upstream end section of the precompressor casing (specifically as closely as possible to the fan), the precompressor casing must be designed for this (at least theoretically occurring) additional tensile load. Because of the required massive design, this leads not only to a high weight but, in addition, necessitates the use of high-strength materials for the booster casing, both of which is undesirable.

It is an object of the present invention to provide a remedial measure for the described problems.

This object is achieved in that the upstream end section of the precompressor casing is, in addition, linked to the compressor casing by means of at least two tension-rod-type tension devices which are situated essentially diametrically opposite one another with respect to the longitudinal axis of the gas turbine. Advantageous developments and further developments are described and claimed herein. In certain preferred embodiments, the tension-rod-type tension devices are constructed as steel cables.

Other objects, advantages and novel features of the present invention will become apparent from the following detailed description of the invention when considered in conjunction with the accompanying drawings.

DETAILED DESCRIPTION OF THE DRAWINGS

Figure 1:
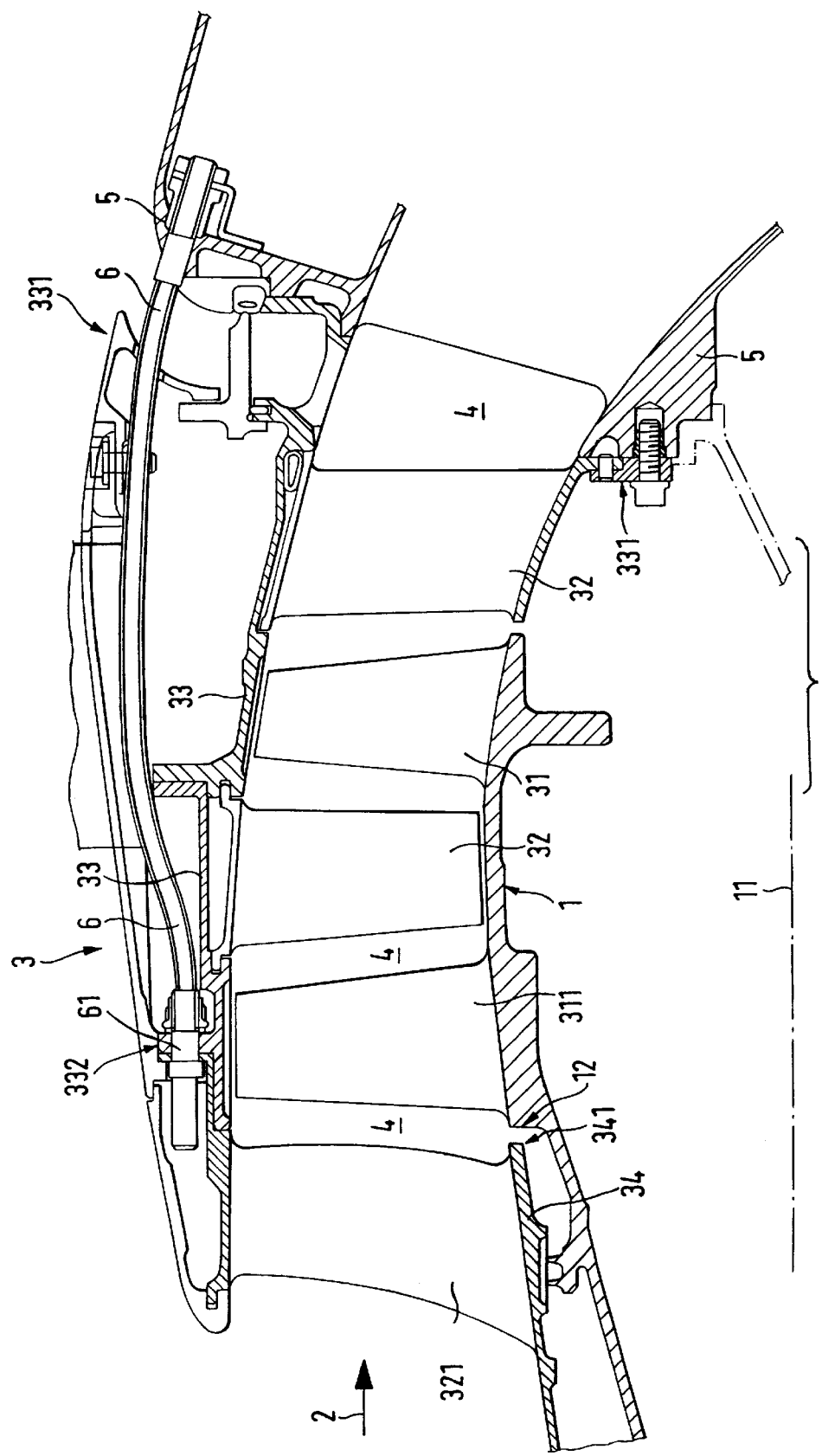
FIG. 1 a partial sectional view of a gas turbine casing assembly in the area of the booster or precompressor adjoining the fan which is not shown, constructed according to a preferred embodiment of the present invention.
Figure 2:
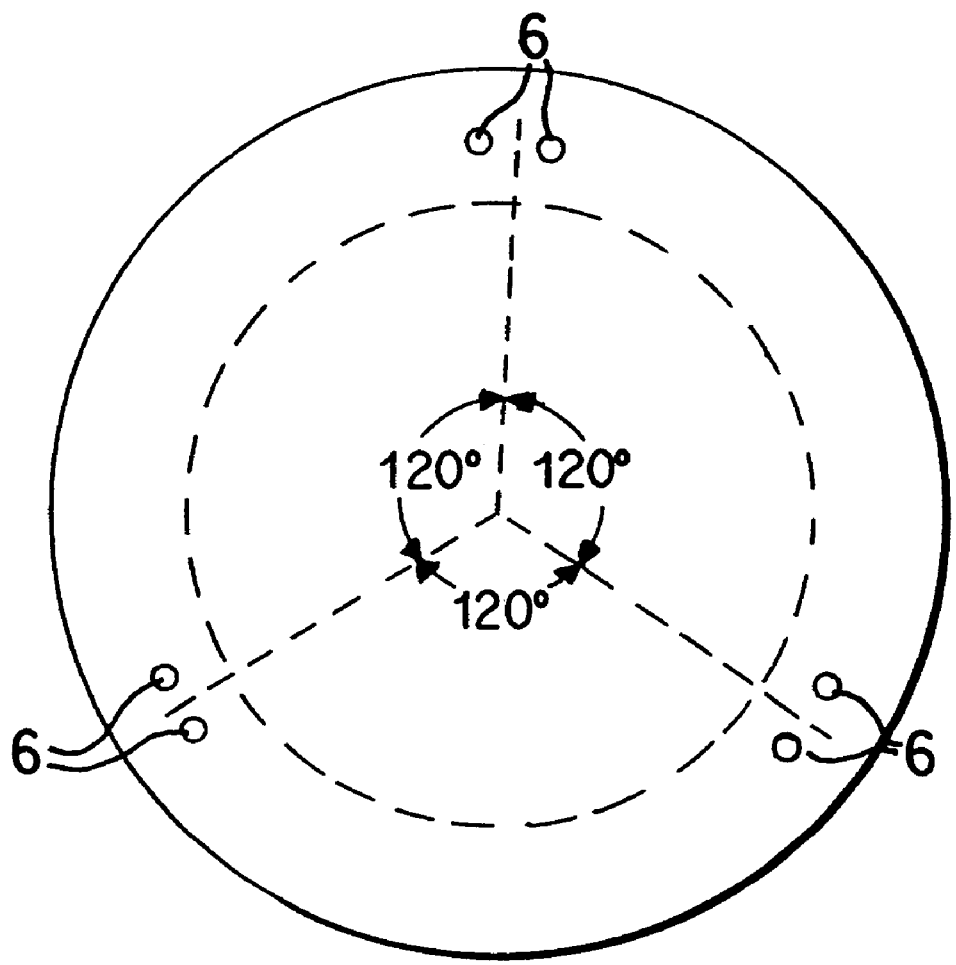
FIG. 2 is a schematic sectional view depicting the circumferential location of the cables joining the precompressor casing and compressor casing of the assembly of FIG. 1.

Reference number 1 indicates the only partially shown fan shaft of a twin-jet gas turbine engine whose axis, as usual, coincides with the longitudinal axis of the gas turbine. In the figure, these axes are invisible because they are situated far below the margin of the sheet. A line 11 in parallel to the longitudinal axis of the gas turbine and to the axis of the fan shaft 1 is shown instead.

On the left-hand side, the fan shaft 1 carries a fan, which is not shown. The flow through the jet engine or its inlet area illustrated here therefore takes place from the left to the right according to the direction of the arrow 2. In this case, the fan shaft 1 also carries the rotor blades 31 of a precompressor (or booster) which, as a whole, has the reference number 3, and which has in this case, three rows of stator blades 32 which are suspended in a precompressor casing 33. As usual, this precompressor or booster casing 33, together with the fan shaft 1, bounds the flow duct 4 for the air current guided through the compressor, the combustion chamber and the high-pressure turbine of the jet engine according to flow direction 2.

The figures do not show the last-mentioned components of the gas turbine jet engine, specifically the conventional combustion chamber as well as the adjoining high-pressure turbine and the low-pressure turbine which follows. However, the compressor casing 5, which also bounds the flow duct 4 behind the booster casing 33, is still partially shown by means of its forward end area. This compressor casing 5 (also called "intermediate casing", as usual, surrounds the compressor of the jet engine gas turbine (not shown here) which adjoins the booster 3 in the flow direction 2 and—viewed in the flow direction 2—directly follows the booster casing 33. In a manner not shown, the downstream end section 331 of the booster casing 33 is detachably connected or fastened to the upstream end of the compressor casing 5.

As illustrated and mentioned above, the booster casing 33 carries three rows of stator blades 32 projecting into the flow duct 4. The stator blades 32 which are first and frontmost with respect to the flow direction 2 are called initial guide blades 321. The inner ring 34 of the initial guide blades 321, that is, the ring 34 facing the longitudinal axis of the gas turbine (or the parallel line 11) is therefore also a component of the precompressor casing 33. In this case, the downstream end edge of the ring 34 has the reference number 341.

Should, in an extremely improbable operating event of the gas turbine jet engine, the fan shaft 1 break, it has to be prevented that the fan can move out of the engine toward the front, that is, against the direction of the arrow 2. When such an improbable break of the fan shaft 1 occurs, the breaking point will always be relatively far downstream of the fan and thus also downstream of the booster 3. As the result, in the event of a breakage of the fan shaft 1 (which, as usual, continues to the above-mentioned low-pressure turbine of the jet engine), the partial area of the fan shaft 1 illustrated in the figure, would also tend to move away toward the front against the direction of the arrow 2. However, in that case, the step 12 provided on the face side of the frontmost rotor blade 311 of the booster 3 on the fan shaft 1 would collide with the downstream end edge 341 of the ring 34. This has the result that the fan and the broken-off section of the fan shaft 1 carrying it, including the booster rotor, consisting of the rotor blades 31 arranged on the corresponding section of the fan shaft 1, is prevented from moving opposite the direction of the arrow 2.

The downstream end edge 341 and therefore the booster casing 33 will therefore in cooperation with the step 12 of the fan shaft 1, hold back the latter, which represents an efficient safety measure in the event of a breakage of the fan shaft 1. In a more general embodiment of the invention, in addition (as an alternative), any connection parts of the fan shaft 1 can, in the event of a shaft breakage, strike against stationary casing parts of the jet engine gas turbine. In the embodiment illustrated here, these stationary casing parts are components of the casing 33 of the precompressor 3.

So that the casing 33 of the precompressor 3 can carry out this described safety function, it must have a correspondingly massive construction. The reason is that, after the precompressor casing 22 has been fastened by means of its downstream end section 331 on the compressor casing 5, while the forces occurring during a breakage of the fan shaft 1, as illustrated, have to be absorbed by the upstream end section 332 of the booster casing 33, the booster casing 33 would have to be designed for this at least theoretically occurring additional tensile load. Because of the required massive design, this would lead not only to a high weight but, in addition, necessitate the use of high-strength materials for the booster casing 33, both of which is undesirable.

As a remedial measure for these described problems, it is provided according to the invention that the upstream end section 332 of the precompressor casing 33 is, in addition, linked to the compressor casing 5 by means of at least two tension-rod-type tension devices 6 which are situated essentially diametrically opposite one another with respect to the longitudinal axis of the gas turbine (or the line 11 in parallel thereto). By way of these tension devices 6, the forces introduced in the event of a breakage of the fan shaft 1 by way of the downstream end edge 341 into the booster casing 33 can then be introduced directly into the intermediate casing or compressor casing 5 and thus into the overall structure of the jet engine, without any action upon the booster casing 33 itself by particularly high tensile forces— which are directed against the direction of the arrow 2. The supporting force by which the fan as well as the section of the fan shaft 1 carrying it is supported on the end edge 341 is therefore introduced by way of the tension-rod type tension devices essentially while bypassing the ring-type jacket of the booster casing 33 into the compressor casing 5. As a result, the booster casing 33 must not be designed for such an additional load and can therefore also be constructed of a non-high-strength light-weight material, such as aluminum.

In the illustrated preferred embodiment of the invention, the tension-rod-type tension devices 6 are constructed as steel cables which are fastened by means of their two ends, on the one side, on the upstream end section 332 of the precompressor casing 33 and, on the other side, on the compressor casing 5, specifically preferably also in its upstream end area. This fastening can take place in any current fashion. In this context, it is only important that the desired transmission of force is made possible; that is, that the steel cables (in the following, these will also have the reference number 6) can act as tension rods. In other words, this means that, by means of the tension-rod-type tension devices or steel cables 6 applied to the upstream end section 332 of the booster casing 33, the booster casing 33 is pressed with its downstream end section 331 (or with its appropriately designed end flange) against the compressor casing 5 (or against its appropriately designed initial flange).

In the sense of an advantageous further development of the invention, it is provided that the steel cables 6 (or generally the tension devices 6) are fastened to at least one of the two casings 5, 33 by means of a tension-nut-type end piece 61. In a simple manner, it will then be possible during the mounting of the jet engine gas turbine to brace the two casings, specifically the precompressor casing 33 as well as the compressor casing 5, in a desired manner with respect to one another by a suitable adjusting of the tension nut of the end piece 61 which is not indicated in detail. Since such tension nut constructions are known to the person skilled in the art, the detailed construction of the tension-nut-type end piece 61 will not be discussed here.

However, it will be pointed out in the following that, instead of two tension-rod-type tension devices 6, naturally several tension devices 6 of this type may also be provided according to contemplated preferred embodiments of the invention. In order to avoid in this case any slight jamming of the two casings 5, 33 with respect to one another, these tension devices 6 should essentially be diametrically opposite one another with respect to the longitudinal axis of the gas turbine (or with respect to the parallel line 11 thereto). The arrangement of the tension devices 6 distributed essentially uniformly over the circumference of the booster casing 33 is therefore important. If a total of three tension devices 6 or steel cables 6 are provided, viewed along the circumference or the cross-sectional surface of the booster casing 33, these should each be arranged successively in sectors of 120°. The term "at least two mutually essentially mutually diametrically opposite tension devices" should also explicitly include a design of this type. However, it was found that a pair-type arrangement of tension devices 6, which each are situated diametrically opposite one another as exactly as possible, furnished the best results. In this case, in a preferred embodiment, three pairs of tension devices 6 and therefore a total of six steel cables 6 are mounted in a uniformly distributed manner along the circumference of the precompressor casing 33.

Finally, it should be pointed out that a comparable design according to the invention can also be used in the case of other gas turbine systems where the same problems exist. Naturally, a large number of details, particularly of a constructive type, can be designed to deviate from the illustrated embodiment without leaving the content of the claims.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Casing construction on a gas turbine having a fan downstream of which a precompressor is situated, comprising precompressor casing detachably connected with a compressor casing of a compressor which follows the precompressor—viewed in the flow direction, wherein an upstream end section of the precompressor casing is additionally linked to the compressor casing by at least two tension-rod-type tension devices situated essentially diametrically opposite one another with respect to a longitudinal axis of the gas turbine.

2. Casing construction according to claim 1, wherein the tension-rod-type tension devices are constructed as steel cables which are fastened to at least one of the two casings by means of a tension-nut-type end piece.

3. Casing construction according to claim 1, wherein the precompressor casing is constructed of a non-high-strength material and is linked by means of several pairs of the tension-rod-type tension devices on the compressor casing of the compressor.

4. Casing construction according to claim 2, wherein the precompressor casing is constructed of a non-high-strength material and is linked by means of several pairs of the tension-rod-type tension devices on the compressor casing of the compressor.

5. A gas turbine engine casing assembly for a gas turbine engine having a precompressor and a compressor disposed downstream of the precompressor, said casing assembly comprising:

a precompressor casing which in use surrounds at least parts of the precompressor, a compressor casing which in use surrounds at least parts of the compressor, a detachable connection connecting the precompressor casing with the compressor casing, and a plurality of tension devices disposed around the casings and linking an upstream end of the precompressor casing with the compressor casing.

6. A casing assembly according to claim 5, wherein said plurality of the tension devices consists of three steel cables.

7. A casing assembly according to claim 5, wherein said plurality of tension devices consists of six steel cables.

8. A casing assembly according to claim 5, wherein the tension devices are steel cables fastened to the casings by tension nut type pieces.

9. A casing assembly according to claim 5, wherein the precompressor casing is constructed of a non-high-strength material and is linked by means of several pairs of tension devices on the compressor casing of the compressor.

10. A casing assembly according to claim 9, wherein three pairs of said tension devices are provided.

11. A casing assembly according to claim 5, wherein each of the tension devices includes a steel cable.

12. A casing assembly according to claim 10, wherein each of the tension devices includes a steel cable.

* * * * *